(12) United States Patent
Nishida et al.

(10) Patent No.: US 10,189,223 B2
(45) Date of Patent: Jan. 29, 2019

(54) BEAD FORMING APPARATUS AND FORMING METHOD

(71) Applicants: FUJI SEIKO CO., LTD., Hashima-shi (JP); FUJI SHOJI CO., LTD., Hashima-shi (JP)

(72) Inventors: Kihachiro Nishida, Hashima (JP); Shigeaki Nomura, Hashima (JP)

(73) Assignees: FUJI SEIKO CO., LTD., Hashima-shi (JP); FUJI SHOJI CO., LTD., Hashima-shi (JP)

( * ) Notice: Subject to any disclaimer, the term of this patent is extended or adjusted under 35 U.S.C. 154(b) by 213 days.

(21) Appl. No.: 14/760,625

(22) PCT Filed: Jan. 17, 2013

(86) PCT No.: PCT/JP2013/050771
§ 371 (c)(1),
(2) Date: Jul. 13, 2015

(87) PCT Pub. No.: WO2014/112065
PCT Pub. Date: Jul. 24, 2014

(65) Prior Publication Data
US 2015/0360429 A1    Dec. 17, 2015

(51) Int. Cl.
*B29D 30/48*    (2006.01)

(52) U.S. Cl.
CPC ........ *B29D 30/48* (2013.01); *B29D 2030/482* (2013.01)

(58) Field of Classification Search
CPC .............. B29D 30/48; B29D 2030/481; B29D 2030/487
See application file for complete search history.

(56) References Cited

U.S. PATENT DOCUMENTS

| 5,080,738 A |   | 1/1992 | Araki et al. |
|---|---|---|---|
| 5,486,261 A | * | 1/1996 | Kikuchi ................. B29D 30/48 |
|   |   |   | 156/422 |

(Continued)

FOREIGN PATENT DOCUMENTS

| CN | 201009436 | * | 1/2008 | ............. B29D 30/30 |
|---|---|---|---|---|
| JP | 2 62232 |   | 3/1990 |   |

(Continued)

OTHER PUBLICATIONS

Machine generated English language translation of CN 201009436 (Original document dated Jan. 2008).*

(Continued)

*Primary Examiner* — Martin K Rogers
(74) *Attorney, Agent, or Firm* — Oblon, McClelland, Maier & Neustadt, L.L.P.

(57) ABSTRACT

A bead forming apparatus including: a rotatable drum having a plurality of divided bodies dividedly arranged along a circumference and being adapted to be wrapped therearound with a belt-shaped bead filler having a short base and two other long sides in an annular shape; a plurality of erection arms provided along the circumference and swingably supported by the divided bodies of the rotatable drum so as to erect the bead filler by swinging the erection arms; and a swing device for swinging the erection arms; and a plurality of slide members provided as contact portions of the erection arms that come into contact with the bead filler so that the bead filler can be radially slidable relative to the erection arms.

1 Claim, 6 Drawing Sheets

(56) References Cited

U.S. PATENT DOCUMENTS

| | | | | |
|---|---|---|---|---|
| 5,735,995 A | * | 4/1998 | Bull | B29D 30/48 156/130.7 |
| 6,524,416 B1 | * | 2/2003 | Kubinski | B29D 30/48 156/131 |
| 7,316,256 B2 | * | 1/2008 | Slots | B29D 30/245 156/402 |
| 2003/0047284 A1 | * | 3/2003 | Akiyama | B29D 30/245 156/415 |
| 2007/0267126 A1 | * | 11/2007 | Gerighausen | B29D 30/242 156/136 |

FOREIGN PATENT DOCUMENTS

| | | | | |
|---|---|---|---|---|
| JP | 07 54288 | | 2/1995 | |
| JP | 2524059 | | 8/1996 | |
| JP | 2002-52624 | * | 2/2002 | B29D 30/48 |
| JP | 2002 052624 | | 2/2002 | |
| JP | 2004-66568 | * | 3/2004 | B29D 30/48 |
| JP | 2011 194854 | | 10/2011 | |
| WO | WO 2012/147012 | * | 11/2012 | B29D 30/24 |

OTHER PUBLICATIONS

English language Abstract of CN 201009436 (Original document dated Jan. 2008) (Year: 2008).*
Machine generated English language translation of JP 2002-52624 (Original document dated Feb. 2002) (Year: 2002).*
International Search Report dated Feb. 12, 2013 in PCT/JP2013/050771 Filed Jan. 17, 2013.

* cited by examiner

BEAD FORMING APPARATUS AND FORMING METHOD

TECHNICAL FIELD

The present invention relates to a bead forming apparatus and a bead forming method for erecting a bead filler wrapped around the outer periphery of a rotatable drum and joining the bead filler to the outer periphery of a bead core.

BACKGROUND ART

Generally, a bead for use in a pneumatic tire is formed in such a way that a belt-shaped bead filler formed in an approximate triangular shape having a short base and two other long sides is wrapped around the outer periphery of a rotatable drum in an annular shape and then the bead filler is radially outwardly erected to be joined to the outer periphery of a bead core at the short base of the bead filler. A bead manufacturing apparatus of this type is known, being described, for example, in Patent Literature 1.

The bead manufacturing apparatus described in Patent Literature 1 is constituted such that a belt-shaped apex (bead filler) is annularly wrapped around the outer peripheries of a plurality of segments provided along the outer peripheral surface of a bead ring (bead core) and the position of the segments is changed from a laid-down position to an erect position by a link mechanism to change the position of the apex together with the segments, and the base of the apex, which has been set to the erect position, is joined to the outer periphery of the bead ring that is held by a bead clamper.

CITATION LIST

Patent Literature

[Patent Literature 1] Japanese Patent No. 2524059

SUMMARY OF INVENTION

Technical Problem(s)

In the bead manufacturing apparatus described in Patent Literature 1, the base end and the top end of the apex (bead filler) that is wrapped around the segments are erected integrally with the segments. In this case, the thinner top end is stretched more than the base end at a greater extension ratio. However, as the apex is adhered to the segments and thus cannot move relative to the segments, wrinkling occurs on the apex, making the shape of the top end unstable and thus degrading the uniformity of the apex. As a result, problems, such as air being trapped, may occur during vulcanization molding of a green tire if a bead manufactured as described above is incorporated into the green tire.

The present invention has been made to solve the above-described conventional problem, and its object is to provide a bead forming apparatus and a bead forming method that suppress wrinkling of a bead filler during erection of the bead to achieve an excellent uniformity, by providing slide members on respective erection arms for erecting the bead filler as contact portions thereof which come into contact with the bead filler so that the bead filler can be radially slidable relative to the erection arms.

Solution to Problem(s)

To solve the above-described problem, the feature of a first aspect of the invention resides in that a bead forming apparatus is provided with a rotatable drum having a plurality of divided bodies dividedly arranged along a circumference of the rotatable drum and being adapted to be wrapped with a belt-shaped bead filler having a short base and two other long sides, around the rotatable drum in an annular shape; a plurality of erection arms provided along the circumference and respectively swingably supported by the divided bodies of the rotatable drum so as to erect the bead filler by swinging of the erection arms; and a swing device for swinging the erection arms; and a plurality of slide members provided as contact portions of the erection arms that come into contact with the bead filler so that the bead filler can be radially slidable relative to the erection arms.

The feature of a second aspect of the invention resides in that in the bead forming apparatus according to the first aspect of the invention, the slide members are formed by a plurality of rotatable rollers rotatably provided in a longitudinal direction of the erection arms.

The feature of a third aspect of the invention resides in that in the bead forming apparatus according to a first or second aspect on the invention, the swing device includes a link mechanism connected to the erection arm and an actuating device for actuating the link mechanism.

The feature of a fourth aspect of the invention resides in that the bead forming apparatus according to the third aspect of the invention, wherein the respective link mechanisms are separated from the actuating device, and further comprises a diameter changing mechanism for changing a diameter of the rotatable drum.

The feature of a fifth aspect of the invention resides in that in a bead forming method for forming a bead by erecting a belt-shaped bead filler having a short base and two other long sides and joining the bead filler to an outer periphery of a bead core, the method is provided with erecting the bead filler while sliding on slide members relative to a plurality of erection arms in a longitudinal direction of the erection arm by swinging the erection arms that are respectively swingably supported by a plurality of divided bodies dividedly arranged along a circumference around which the bead filler is wrapped in an annular shape before swinging the erection arms; whereby, joining the short base of the bead filler to the outer periphery of the bead core.

Advantageous Effects of Invention

According to the first aspect of the invention configured as described above comprises a rotatable drum having a plurality of divided bodies dividedly arranged along a circumference of the rotatable drum and being adapted to be wrapped with a belt-shaped bead filler having a short base and two other long sides, around the rotatable drum in an annular shape; a plurality of erection arms provided along the circumference and respectively swingably supported by the divided bodies of the rotatable drum so as to erect the bead filler by swinging of the erection arms; a swing device for swinging the erection arms; and a plurality of slide members provided as contact portions of the erection arms that come into contact with the bead filler so that the bead filler can be radially slidable relative to the erection arms. Accordingly, when the bead filler are erected by swinging the erection arms, the slide members allow the bead filler to smoothly slide relative to the erection arms, which suppress wrinkling of the bead filler so as to maintain the excellent uniformity.

According to the second aspect of the invention, as the slide members are formed by a plurality of rotatable rollers rotatably provided in a longitudinal direction of the erection arms, the bead filler can be smoothly slid relative to the erection arms due to the rotatable rollers.

According to the third aspect of the invention, as the swing device includes a link mechanism connected to the erection arm and an actuating device for actuating the link mechanism, the erection arm can be swung by the actuating device via the link mechanism.

According to the fourth aspect of the invention, the respective link mechanisms are separated from the actuating device, and further there is provided with a diameter changing mechanism for changing a diameter of the rotatable drum. Accordingly, the diameter changing mechanism makes it possible to form different kind of beads that match a plurality of tire diameters. Further, the erection arms can be swung by the actuating device mounted on a fixed portion via the link mechanisms.

According to the fifth aspect of the invention, the bead filler is being erected while sliding on slide members relative to a plurality of erection arms in a longitudinal direction of the erection arm by swinging the erection arms that are respectively swingably supported by a plurality of divided bodies dividedly arranged along a circumference around which the bead filler is wrapped in an annular shape before swinging the erection arms; whereby, joining the short base of the bead filler to the outer periphery of the bead core. Accordingly, when the bead filler is erected by the erection arms, the rotatable rollers allow the bead filler to smoothly slide relative to the erection arms, which suppress wrinkling of the bead filler so as to maintain the excellent uniformity.

DESCRIPTION OF EMBODIMENTS

Figure 1:
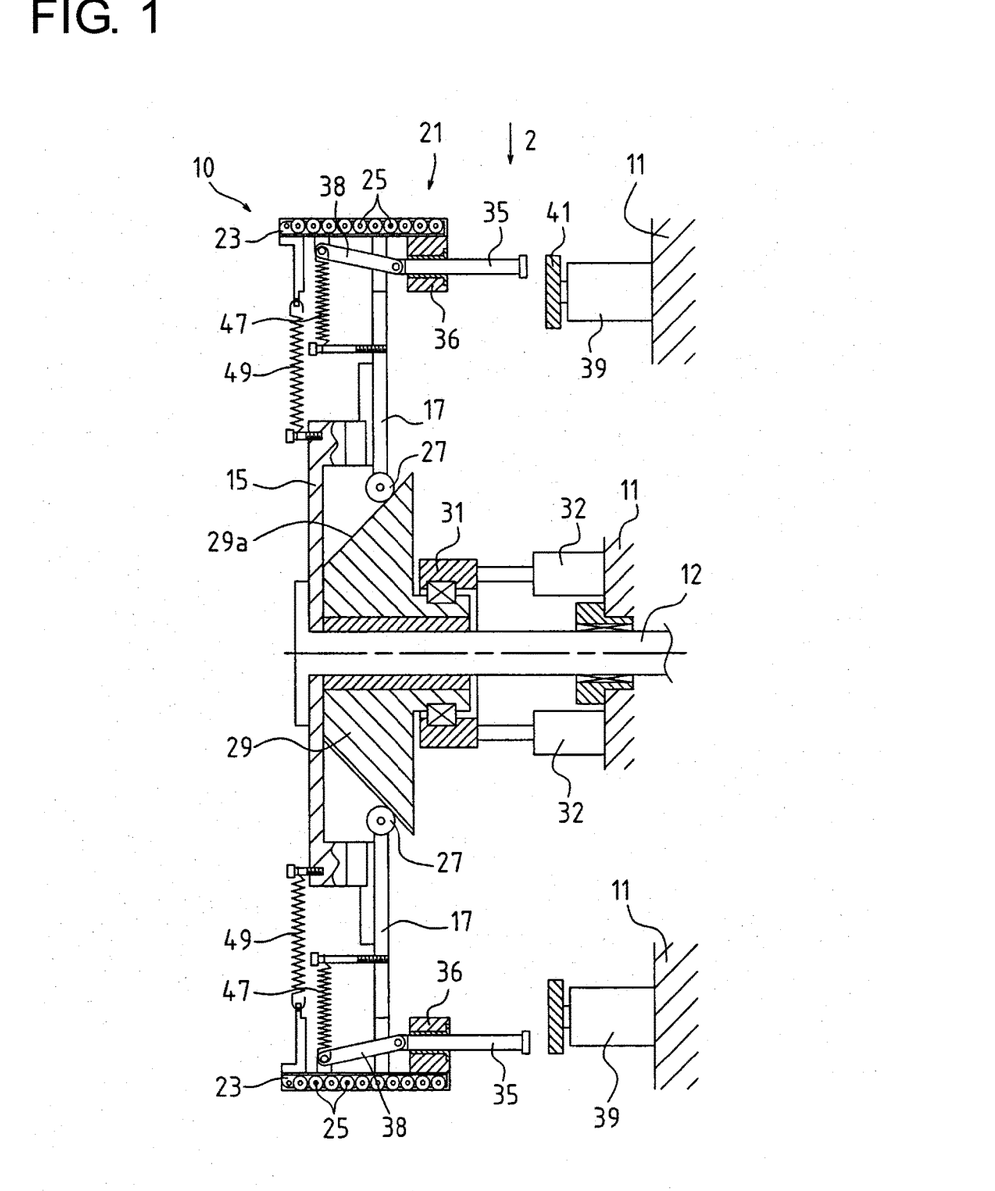
FIG. 1 is an overall view of a bead forming apparatus according to an embodiment of the present invention.
Figure 2:
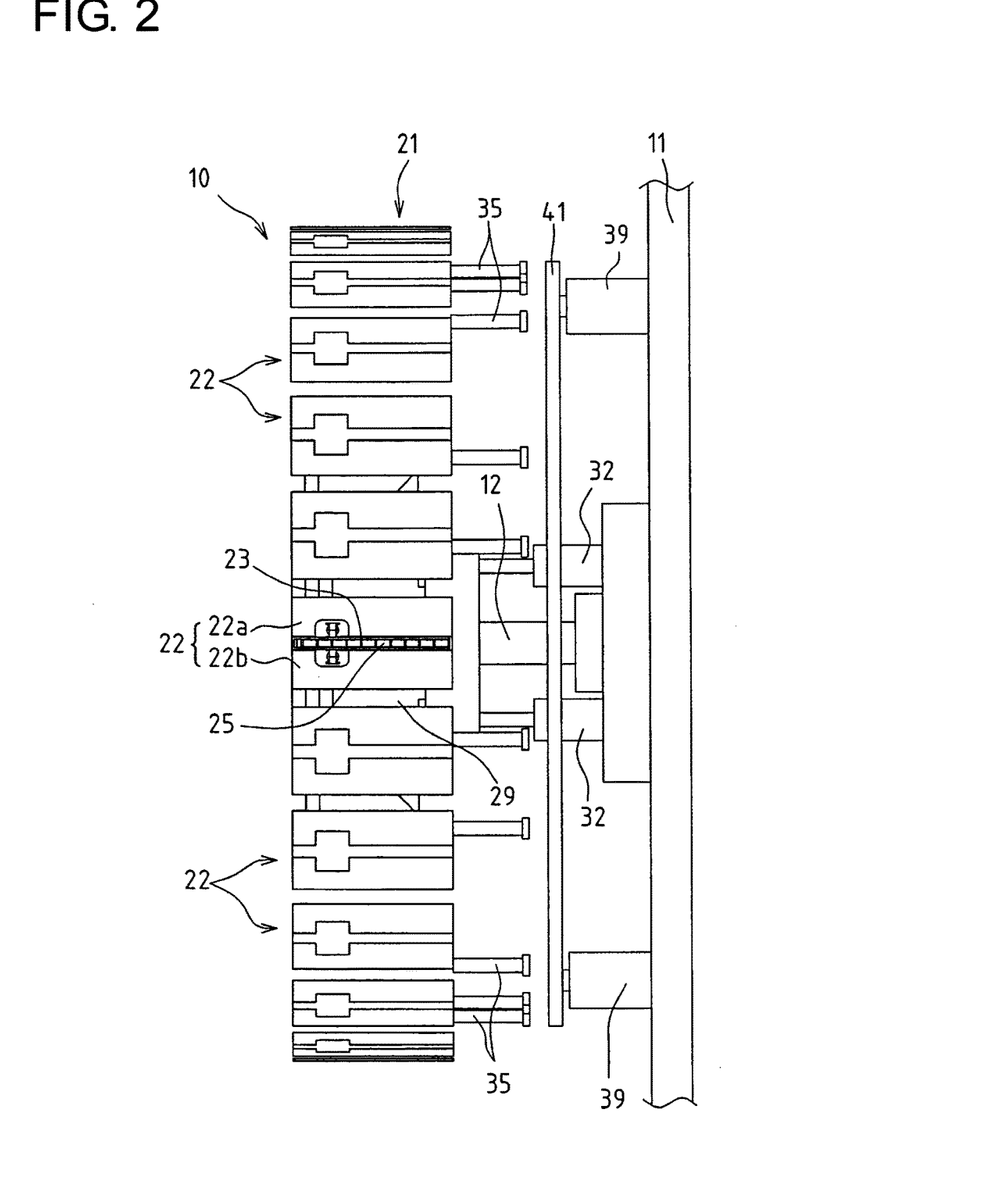
FIG. 2 is a view seen from the direction of an arrow 2 shown in FIG. 1.
Figure 3:
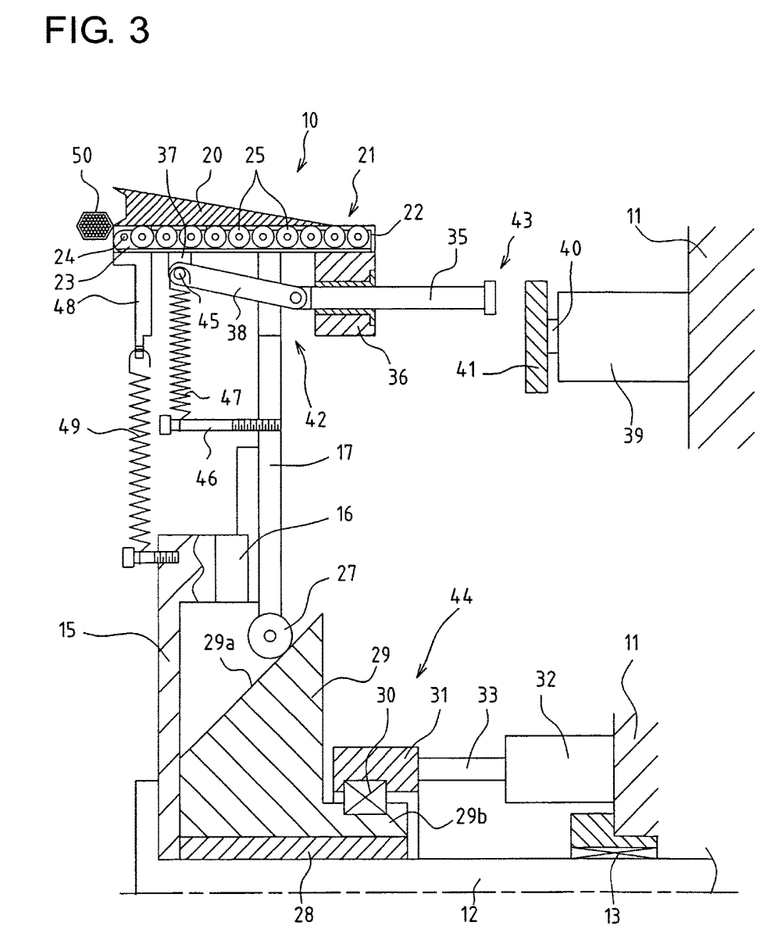
FIG. 3 is an enlarged view showing the upper half of FIG. 1 with a bead filler mounted thereon.

An embodiment of the present invention will be described hereinafter based on the drawings. As shown in FIGS. 1, 2, and 3, a bead forming apparatus 10 includes a support base 11, and a rotatable shaft 12 is supported on the support base 11 via a bearing 13 (see FIG. 3) so as to be rotatable about a horizontal axis. The rotatable shaft 12 is connected to a motor (not shown) so as to be rotated.

A rotatable circular disk 15 is secured to the top end of the rotatable shaft 12. A plurality of linear guides 16 (see FIG. 3) are provided on the circumference of the rotatable disk 15, and support members 17 whose number is the same as that of the linear guides 16 are guided by the respective linear guides 16 so as to be movable in radial directions of the rotatable disk 15. A rotatable drum 21 which is adapted to be wrapped with a belt-shaped bead filler 20 in an annular shape is mounted on the radially outer ends of the plurality of support members 17.

The rotatable drum 21 is composed of a plurality of divided bodies 22 divided in the circumferential direction and the plurality of support members 17 secured to these divided bodies 22. Plate-shaped erection arms 23 are respectively swingably supported on dividedly arranged bodies 22 at one end thereof so as to allow the erection arms 23 to swing about respective pivots 24 (see FIG. 3). A plurality of rotatable rollers 25 that come into contact with the long side of the bead filler 20 when the bead filler 20 is wrapped around the rotatable drum 21, are rotatably provided on a contact portion of the erection arm 23 in the longitudinal direction thereof so as to be rotatable about axes that are parallel to the center of rotation of the pivot 24.

More specifically, as shown in FIG. 2, each divided body 22 is composed of two members 22a and 22b spaced apart in the tangential direction to the rotatable drum 21, and an erection arm 23 is rotatably supported between these two members 22a and 22b. As shown in FIG. 3, when the erection arms 23 are tilted to a horizontal position, the plurality of rotatable rollers 25, supported on the erection arms 23, and the outer circumference of the rotatable drum 21 (the outer surfaces of the divided bodies 22) are configured so as to be approximately flush with one another.

As shown in FIG. 3, the bead filler 20 is made of belt-shaped rubber extruded into an approximate triangular shape in cross section having a short side (short base) and two other long sides. The bead filler 20 is wrapped around the outer surface of the rotatable drum 21 in such a manner that one of the long sides comes into contact with the outer surfaces of the divided bodies 22 and the short base is oriented towards the front end of the rotatable drum 21. The bead filler 20, wrapped around the rotatable drum 21, is cut to a predetermined length, and both ends thereof are joined together by pressure joining to form an annular bead filler 20. It is noted that the longitudinal length of the divided body 22 and the erection arm 23 are set to correspond to the length of the long side of the bead filler 20.

A follower roller 27 is rotatably supported on the radially inner end of each of the plurality of the support members 17, and these follower rollers 27 are capable of coming into contact with the circular conical surface 29a formed on the outer periphery of a conical block 29 that is axially slidably mounted on the rotatable shaft 12 via a bearing ring 28.

A support ring 31 is supported on the shaft portion 29b of the conical block 29 via a bearing 30 so as to be capable only of relative rotation. A plurality of cylinder devices 32 for actuating the conical block are arranged on the support base 11 around the rotatable shaft 12, and the support ring 31 is connected to the top ends of the piston rods 33 of these cylinder devices 32. In this way, the conical block 29 is capable of being located in two axial positions by advance and retraction of the cylinder devices 32 via the support ring 31 and the bearing 30. As a result, the support members 17 can be moved radially via the follower rollers 27, which are in contact with the circular conical surface 29a of the conical block 29, to change the radial positions of the divided bodies 22, i.e., the diameter of the rotatable drum 21.

Provided on the inside of each divided body 22 is a guide member 36 that slidably guides a push bar 35 in a horizontal direction, and each push bar 35 is connected via a link 38 to a protrusion 37 that protrudes from the erection arm 23. A plurality of cylinder devices 39 for actuating the push bars 35 are arranged on the support base 11 around the rotatable shaft 12, and a ring-shaped actuating member 41 for actuating the push bars 35 is connected to the top end of the piston rod 40 of each of the cylinder devices 39 arranged coaxially with the rotatable shaft 12 so that the push bars 35 are advanced and retracted by advance and retraction of the cylinder devices 39 (actuating device).

The above-described protrusion 37, link 38, and push bar 35 constitute a link mechanism 42 (see FIG. 3) connected to the erection arm 23, and this link mechanism 42 and the cylinder devices 39 together constitute a swing device 43 for swinging the erection arm 23 (see FIG. 3). Moreover, the follower rollers 27, the conical block 29, the cylinder devices 32, etc., constitute a diameter changing mechanism 44 for changing the diameter of the rotatable drum 21 (see FIG. 3).

In this case, as the actuating members 41 connected to the cylinder devices 39 are separated from the push bars 35, it is possible to cause the conical block 29 to radially move the divided bodies 22, which constitute the rotatable drum 21, while leaving the cylinder devices 39 mounted on the fixed portion stationary.

A tension spring 47 is interposed between the connection pin 45 (see FIG. 3) that connects the protrusion 37 of each erection arm 23 with the link 38 and the support shaft 46 secured to the support member 17. The spring force of this tension spring 47 maintains the erection arm 23 in its original position, in which the erection arm 23 is in contact with the guide member 36 (the tilted position shown in FIG. 3).

Moreover, an engaging member 48 is mounted on one end of each divided body 22, and tension springs 49 are interposed between the engaging members 48 and the periphery of the rotatable disk 15. The spring force of the tension springs 49 biases the divided body 22 in the radially inward direction to press the follower roller 27 against the circular conical surface 29a of the conical block 29. This maintains the divided bodies 22 (the rotatable drum 21) in a predetermined radial position.

The numeral 50 in FIG. 3 denotes a bead core to the outer periphery of which the bead filler 20 is to be joined, and the bead core 50 is to be held on the outer periphery of a bead core holder (not shown) and positioned coaxially with the rotatable drum 21.

A forming method for joining the bead filler 20 to the periphery of the bead core 50 by means of the bead forming apparatus 10 according to the above-described embodiment will be described hereinafter. Normally, the piston rods 40 of the cylinder devices 39 are maintained in the retracted end position, and the erection arms 23 are maintained by spring force of the tension springs 47 in the original position, in which the erection arms 23 are in their tilted position (horizontal state) as shown in FIG. 3.

In this situation, the bead core 50 is brought outside of the outer periphery of the bead core holder, and thereafter by expanding the bead core holder, the bead core 50 is held coaxially with the rotatable drum 21 on the outer periphery of the bead core holder. As shown in FIG. 3, accordingly, the bead core 50 is positioned at a position in which the outer periphery of the bead core is adjacent to the center of swing of the erection arms 23 (the pivots 24).

The belt-shaped bead filler 20 is fed onto the divided bodies 22, which constitute the rotatable drum 21, by a feeding apparatus (not shown). In other words, the bead filler 20 is fed to the outer periphery of the rotatable drum 21 so that one of its long sides is brought into contact with the outer surface of one divided body 22 and the short base of the bead filler 20 faces to the top portion of bead core 50. One end of the bead filler 20 thus fed is clamped by a clamping device (not shown), and then in this situation, the rotatable disk 15 is rotated together with the rotatable shaft 12 by a motor (not shown).

Due to the rotation of the rotatable disk 15, the rotatable drum 21 (the divided bodies 22) is rotated via the plurality of the support members 17 provided on a circle so that the bead filler 20 is wrapped around the rotatable drum 21. As a predetermined amount of bead filler 20 is fed to go once around the rotatable drum 21, the bead filler 20 is cut off with a cutting means (not shown). Subsequently, both ends of the bead filler 20 are joined together by pressure joining by a joining device (not shown) to form an annular bead filler 20. As shown in FIG. 3, accordingly, the bead filler 20 is held in a position in which the base of the bead filler 20 is set adjacent to the outer periphery of the bead core 50.

Subsequently, the cylinder devices 39 are actuated to advance the piston rods 40 so that the plurality of push bars 35 provided on a circle are advanced by the ring-shaped actuating members 41 against the spring force of the tension springs 47. Due to the advance of the push bars 35, the erection arms 23 are swung counterclockwise, as seen in FIG. 3, about the pivots 24 via the link mechanisms 42, and the plurality of rotatable rollers 25 supported on the erection arms 23 are brought into contact with the one of the long sides of the bead filler 20. As a result, the rotatable rollers 25 allow the long side of the bead filler 20 to freely slide relative to the erection arms 23 while the long side of the bead filler 20 is radially erected along with the erection arms 23.

In this way, as the bead filler 20 is erected while freely sliding relative to the erection arms 23, the bead filler 20 is not wrinkled during the erection of the bead filler 20 so as not to degrade the uniformity.

Figure 4:
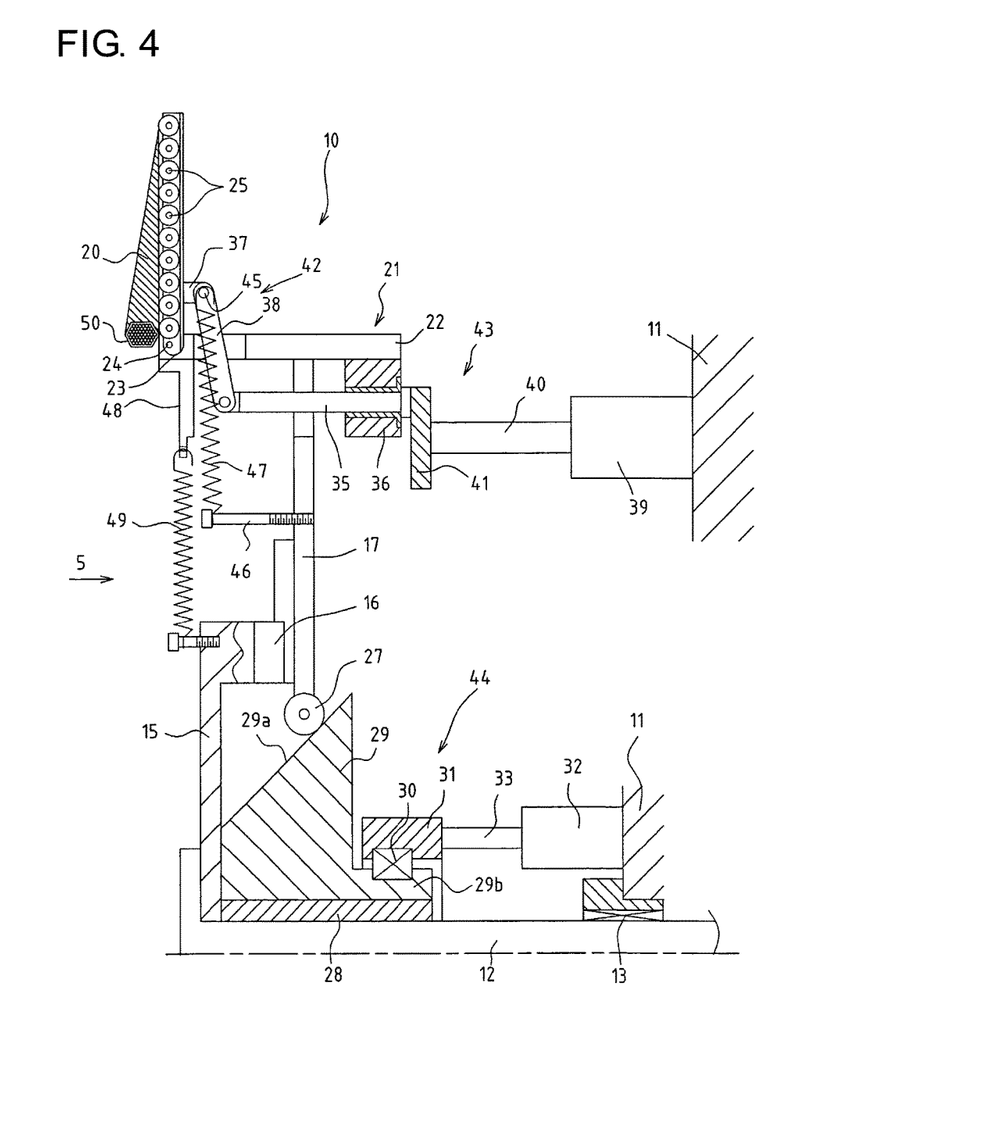
FIG. 4 is a view showing an operation state that the bead filler shown in FIG. 3 is erected.
Figure 5:
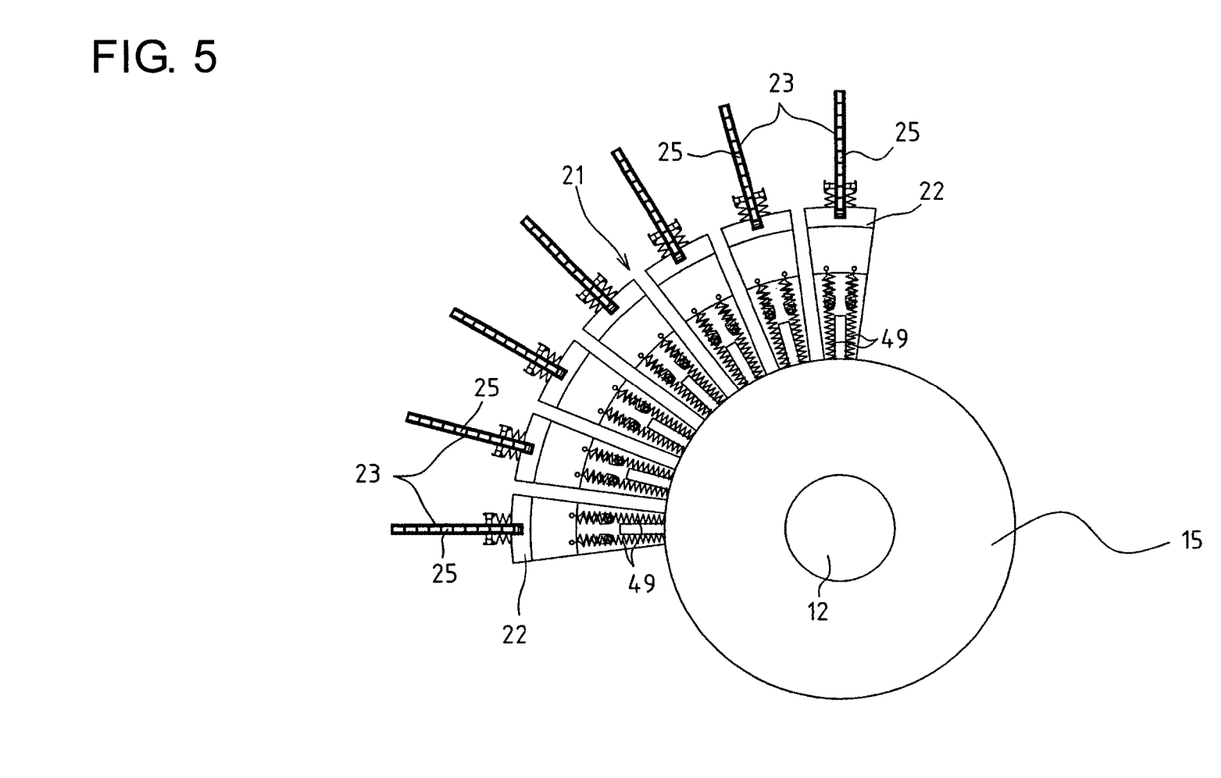
FIG. 5 is a view seen from a direction of an arrow 5 shown in FIG. 4, with the bead filler omitted.

When the push bars 35 are advanced to their predetermined positions by the cylinder devices 39, the bead filler 20 is erected by the erection arms 23 to be in an approximately vertical plane as shown in FIGS. 4 and 5, so that the base of the bead filler 20 is joined (fitted) to the outer periphery of the bead core 50. Thus, the bead filler 20 is erected while being allowed to slide with respect to the erection arms 23. Accordingly, though the bead filler 20 is stretched at different extension ratio between at the portion of the short base (the inner periphery) and at the portion of the top end (the outer periphery), a wrinkle does not occur on the bead filler so that the bead filler 20 can be joined to the bead core 20 with a high degree of precision.

Once the bead filler 20 is joined to the outer periphery of the bead core 50, the cylinder devices 39 are retracted. This allows the spring force of the springs 47 to rotate the erection arms 23 about the pivots 24 counterclockwise as seen in FIG. 4, returning the erection arms 23 to their original positions shown in FIG. 3.

Moreover, in this embodiment, as the radial positions of the divided bodies 22 (the drum diameter of the rotatable drum 21) can be changed by causing the cylinder devices 32 to move the conical block 29, this embodiment can be easily adapted to tire size change.

Figure 6:
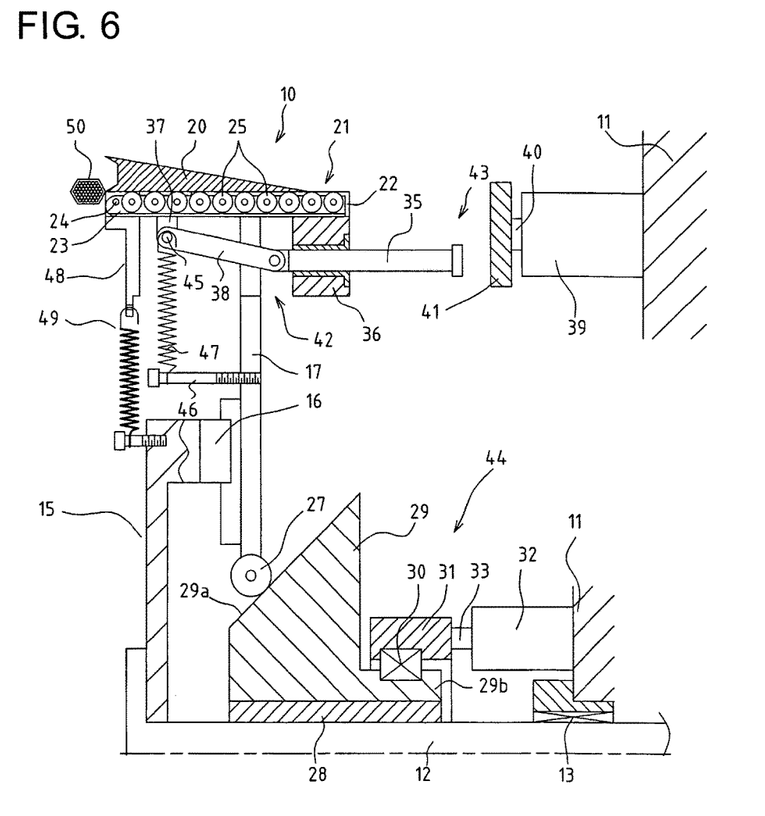
FIG. 6 is a view showing an operation state that the diameter of the rotatable drum shown in FIG. 3 is changed.

In other words, if the cylinder devices 32 at the advanced end positions as shown in FIG. 3 are retracted as shown in FIG. 6, the conical block 29 is retracted via the support ring 31 and the bearing 30. According to such retraction of the conical block 29, the spring force of the springs 47 urges the follower rollers 27 to follow the circular conical surface 29a and to move radially inward. As this causes the plurality of divided bodies 22 arranged on a circle to simultaneously move radially inward via the plurality of the support members 17 provided on a circle, the diameter of the rotatable drum 21 can be easily changed.

Therefore, in accordance to the advanced end positions and the retracted end positions of the cylinder devices 32, the divided bodies 22 can be held in two radial positions so as to be adapted to two different tire sizes. It is noted that when the radial positions of the divided bodies 22 are changed, the bead core 50 and the bead core holder that holds the bead core are also changed.

In this case, if ball screw mechanisms actuated by motors rather than the cylinder devices 32 are employed to actuate the conical block 29, the bead forming apparatus is adaptable to three or more tire sizes.

The above-described embodiment is provided with: a rotatable drum 21 having a plurality of divided bodies 22 dividedly arranged along the circumference of the rotatable drum 21 and being adapted to be rapped with a belt-shaped bead filler 20 having a short base and two other long sides, around the rotatable drum 21 in an annular shape; a plurality of erection arms 23 provided along the circumference and respectively swingably supported by the divided bodies 22 of the rotatable drum 21 so as to erect the bead filler 20 by swinging the erection arms; swing device 43 for swinging the erection arms 23; and a plurality of rotatable rollers 25 are provided as contact portions of the erection arms 23 that come into contact with the bead filler 20 so that the bead filler 20 can be radially slidable relative to the erection arms 23. Accordingly, when the bead filler 20 is erected by the erection arms 23, the rotatable rollers 25 allow the bead filler 20 to smoothly slide relative to the erection arms 23, which suppress wrinkling of the bead filler 20 so as to maintain the excellent uniformity.

According to the above-described embodiment, the link mechanisms 42 are separated from the cylinder devices 39 and the diameter changing mechanism 44 is provided for changing the diameter of the rotatable drum 21. Thereby, the diameter changing mechanism 44 makes it possible to form different kind of beads that match a plurality of tire diameters. Also, as the cylinder devices 39 are separated from the link mechanisms 42, the cylinder devices 39 for rotating the erection arms 23 via the link mechanisms 42 can be mounted on a fixed portion.

In the above-described embodiment, the bead filler 20 is allowed to slide relative to the erection arms 23 by means of, for example, the plurality of rotatable rollers 25, which are provided on the contact portions of the erection arms 23 that come into contact with the bead filler 20, has been described. However, any slide members that are not limited to the rotatable rollers, which are structured to be capable of coming into contact with the bead filler 20 so as to allow the bead filler 20 to slide relative to the erection arms 23 can be used.

Furthermore, in the above-described embodiment, an example in which the diameter of the rotatable drum 21 is changeable is described. However, the present invention can also be applied to those in which the diameter of the rotatable drum 21 is not changeable. In such case, the piston rods 40 of the cylinder devices 39 may be integrated with the push bars 35 of the link mechanisms 42.

The present invention is not limited to the structures described in the embodiment; rather, the present invention may adopt various modes without departing from the scope of the claims.

INDUSTRIAL APPLICABILITY

The bead forming apparatus and the bead forming method according to the present invention are suitable for forming beads for use in pneumatic tires.

REFERENCE SIGNS LIST

10 . . . bead forming apparatus; 20 . . . bead filler; 21 . . . rotatable drum; 22 . . . divided body; 23 . . . erection arm; 25 . . . slide member (rotatable roller); 29 . . . conical block; 39 . . . cylinder device; 42 . . . link mechanism; 43 . . . swing device; 44 . . . diameter changing mechanism; 50 . . . bead core.

The invention claimed is:

1. A bead forming apparatus comprising:
a rotatable drum having a plurality of divided bodies dividedly arranged along a circumference of the rotatable drum and being adapted to be wrapped with a belt-shaped bead filler having a short base and two other long sides, around the rotatable drum in an annular shape;
a plurality of erection arms provided along the circumference and respectively swingably supported around respective pivots by the divided bodies of the rotatable drum so as to erect the bead filler by swinging the erection arms;
a swing device for swinging the erection arms, the swing device including a plurality of link mechanisms connected to the plurality of erection arms, respectively, and an actuating device comprising a plurality of cylinder devices, each having a respective piston rod, and an actuating member in the form of a ring placed at an end of the piston rods; and
a plurality of slide members provided as contact portions of the erection arms that come into contact with the bead filler so that the bead filler can be radially slidable relative to the erection arms,
wherein the plurality of slide members is formed by a plurality of rotatable rollers rotatably provided in a longitudinal direction of the plurality of erection arms so as to be rotatable about axes that are parallel to the respective pivots of the respective erection arm,
wherein each of the link mechanisms includes
a push bar that is slidable horizontally inside a guide member that is provided inside a respective divided body of the plurality of divided bodies,
a protrusion protruding from a respective erection arm of the plurality of erection arms, and
a link pivotally connected to the push bar at a first end of the link and pivotally connected to the protrusion at a second end of the link,
wherein the actuating device can achieve a first retracted position at which the actuating member is not in contact with the push bars while the plurality of erection arms are in a horizontal state, and
wherein the actuating device can move from the first position to a second, extended position at which the actuating member is in contact with a free end of each of the push bars so as to cause the erection arms to become erected by moving the second end of the links to be radially further from an axis of rotation of the rotatable drum in the second position of the actuating device than in the first position of the actuating device; the bead forming apparatus further comprising a diameter changing mechanism for changing a diameter of the rotatable drum as well as changing a radial distance of the push bars from the axis of rotation.

* * * * *